UNITED STATES PATENT OFFICE.

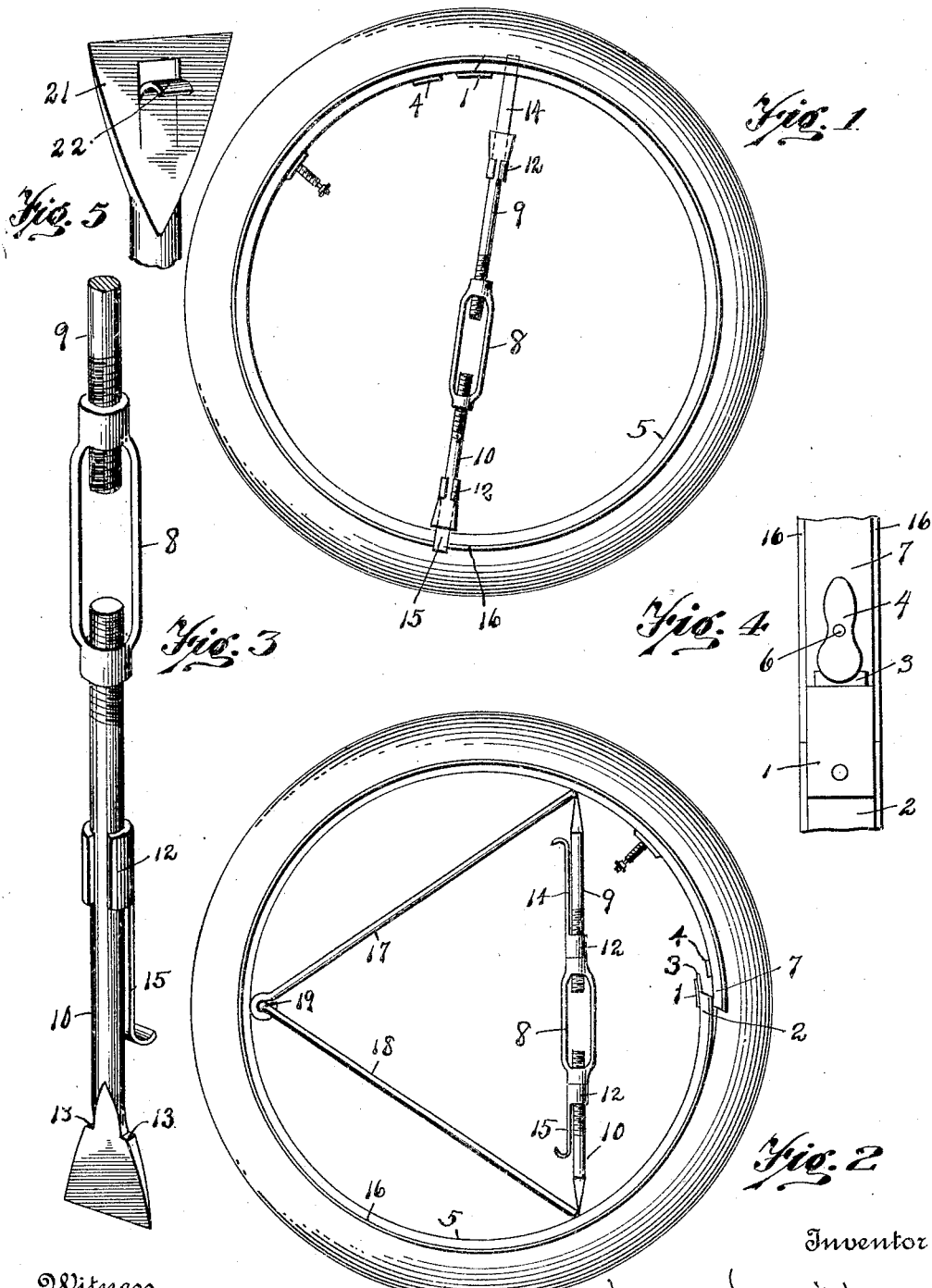

LOUIS JAENICHEN, OF DETROIT, MICHIGAN.

TIRE-TOOL.

1,367,604.   Specification of Letters Patent.   Patented Feb. 8, 1921.

Application filed April 29, 1919. Serial No. 293,444.

*To all whom it may concern:*

Be it known that I, LOUIS JAENICHEN, a citizen of the United States, and residing at Detroit, in the county of Wayne and State of Michigan, have invented a new and Improved Tire-Tool, of which the following is a specification.

This invention relates to means for assisting in the removal and mounting of tires on demountable one-piece rims of motor vehicle wheels, and its object is to provide a simple and effective tool which may be used to both contract the rim to permit removal of the tire and to expand the rim within the tire.

This invention consists in a tire tool comprising a turn-buckle and two threaded rods extending therefrom and provided with flattened ends to engage the inside of a rim of a vehicle wheel, and slidable hooks mounted on said rods between their ends and adapted to engage the outer flanges of the rim. It also consists in two rods or bars of less length than the internal diameter of the rim hinged together and adapted to form two sides of a triangle of which the tire tool forms the third so as to prevent the ends of the tool from slipping on the inner face of the rim.

This invention further consists in the details of construction illustrated in the accompanying drawing and particularly pointed out in the claim.

In the drawing, Figure 1 is an elevation of a demountable rim and the tire thereon and this improved tire tool connected to the flanges of the rim for the purpose of contracting it. Fig. 2 is a similar elevation of the rim and tire with this improved tool in position to expand the rim, the tool being held in position by braces. Fig. 3 is a perspective view of one end of this tool. Fig. 4 is an inside view of the joint portion of a rim. Fig. 5 is a view of a modified end of this tool.

Similar reference characters refer to like parts throughout the several views.

To remove a deflated tire from a one piece rim it is usually necessary to reduce the diameter of the rim which is done by pressing one end of the rim inwardly until it can lap the other end, as shown in Fig. 2.

Many different types of locks for the adjacent ends of rims have been suggested, one of them being shown in Fig. 4 and consisting of a lock plate 1 secured to the end 2 of the one piece rim 5, the plate having a tongue 3 adapted to be engaged by the latch 4 mounted on the pivot 6 on the other end 7 of the rim. The latch is undercut to receive the tongue 3 or the end 7 is grooved to receive this tongue. When the rim is to be contracted the latch is swung to release the tongue 3.

The tire tool consists of a turn-buckle 8 and rods 9 and 10, preferably provided with chisel ends, shoulders 13 being formed adjacent the flattened ends to limit the outward movements of the sleeves 12 at the inner ends of the hooks 14 and 15. When the rim is to be contracted the hooks are engaged with the flanges 16 of the rim, preferably at diametrically opposite points and at opposite sides of the tire, one of the hooks engaging the end 2 of the rim that carries the lock plate if the type of rim lock shown in Fig. 4 is employed. The turn-buckle is then tightened until the end 2 will slip over the end 7, which it is caused to do by the pressure of the tire which may now be removed, repaired and replaced.

To expand the rim so that the ends will again be in alined contact the flattened ends of the tool are placed in engagement with the rim at each side of the joint. If the rim is provided with spacing lugs on the inner side, the ends of the rods 9 and 10 may engage selected lugs. Or small nicks may be formed in the inner side of the rim at selected points to prevent the chisel ends of the tool from slipping. Or some separate device may be employed to position the ends of the tool. In Fig. 2, two rods 17 and 18, preferably joined at 19, are shown placed within the rim so that the ends of the tool may be supported by the adjacent ends of the rods 17 and 18. When the tool is now extended by means of the turn-buckle, the rim will expand until its ends snap into alinement with each other.

Instead of separate slidable hooks on the rods 9 and 10 the chisel ends 21 of these rods may be formed with curved tongues 22 as shown in Fig. 5, which serve as hooks to engage the flanges of the rim in the same manner as do the hooks 14 and 15.

The details, proportions and sizes of the different parts of this tire tool may all be changed by those skilled in the art without departing from the spirit of my invention as set forth in the following claim.

I claim:—

A tire tool comprising a turn-buckle and threaded rods mounted therein and having their outer ends flattened to form shoulders, and hooks formed with sleeves slidable on said rods and limited in their outer movements by said shoulders.

LOUIS JAENICHEN.

Witnesses:
 JOHN C. MATHEWS,
 WILLIAM J. LANSTER.